United States Patent [19]
Lepoutre

[11] Patent Number: 5,954,096
[45] Date of Patent: Sep. 21, 1999

[54] TUBE IMPERVIOUS TO LIQUIDS

[76] Inventor: Henri Lepoutre, B.P. 427, Roubaix, France, 59058

[21] Appl. No.: 08/876,922

[22] Filed: Jun. 16, 1997

[30] Foreign Application Priority Data

Jun. 18, 1996 [FR] France .................................. 96 07522

[51] Int. Cl.⁶ ..................................................... F16L 11/04
[52] U.S. Cl. .......................... 138/129; 138/137; 138/142; 138/144
[58] Field of Search .................................... 138/129, 125, 138/137, 142, 144

[56] References Cited

U.S. PATENT DOCUMENTS

| | | | |
|---|---|---|---|
| 2,669,258 | 2/1954 | Spitz | 138/129 |
| 2,943,644 | 7/1960 | Moseley | 138/125 |
| 3,205,913 | 9/1965 | Ehlers | 138/125 |
| 3,255,780 | 6/1966 | Squirrell | 138/122 |
| 3,706,326 | 12/1972 | Bringolf | 138/129 |
| 4,153,080 | 5/1979 | Murray, Jr. et al. | 138/126 |
| 4,402,346 | 9/1983 | Cheetham et al. | 138/129 |

FOREIGN PATENT DOCUMENTS

| | | |
|---|---|---|
| 1.225.681 | 7/1960 | France . |
| 1.369.458 | 7/1964 | France . |
| 2 535 010 | 4/1984 | France . |
| 2 720 471 | 12/1995 | France . |

*Primary Examiner*—James F. Hook
*Attorney, Agent, or Firm*—Renner, Kenner, Greive, Bobak, Taylor & Weber

[57] ABSTRACT

A liquid-impervious tube, includes at least one first band helically wound on itself, characterized in that this first band is porous and pervious to gaseous fluids and in that it includes a second thin band which is pervious to gaseous fluids and impervious to liquids, and which is also helically wound on itself, with partial overlapping of its turns, said turns being secured to one another in a impervious manner so that the second band defines a liquid-impervious continuous covering.

11 Claims, 1 Drawing Sheet

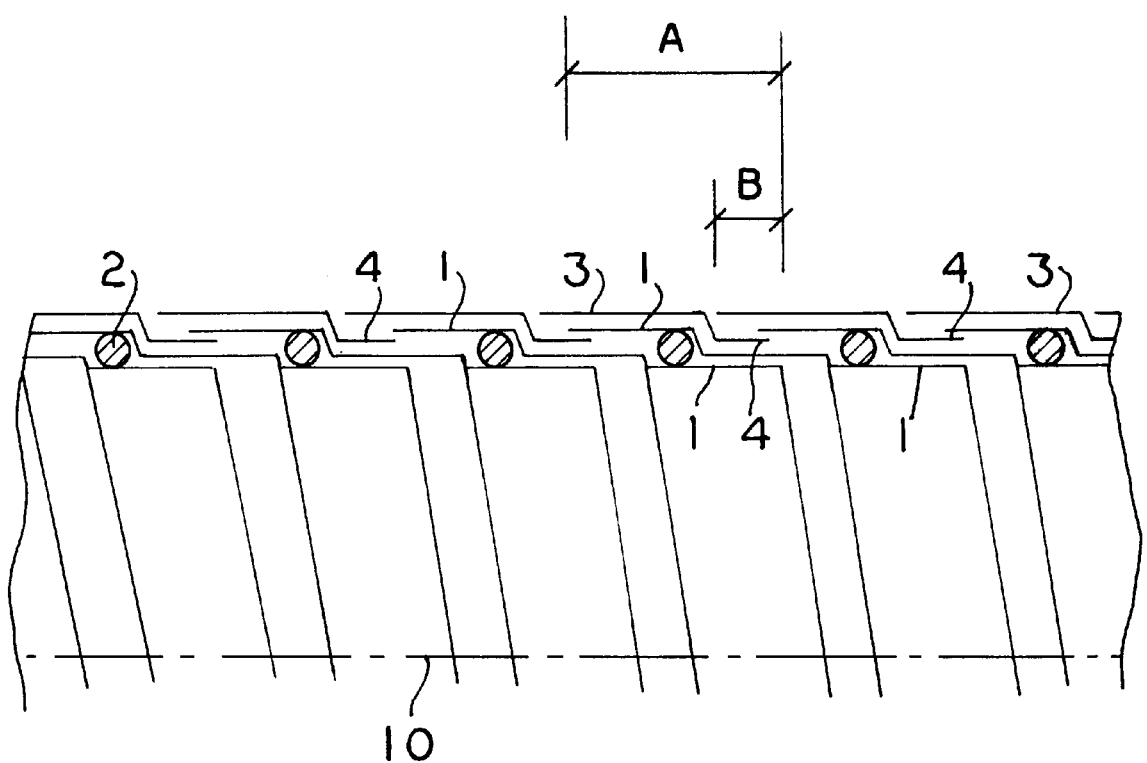

TUBE IMPERVIOUS TO LIQUIDS

TECHNICAL FIELD

The present invention relates to tubes which are impervious to liquids and which are of the type comprising at least one first band helically wound on itself.

BACKGROUND ART

The invention applies particularly but not exclusively to such tubes which are flexible and which are intended to transport gaseous fluids, among others in automobiles for transporting air in the internal combustion engine or the passenger space. In this application the tubes, while being impervious to liquids, are porous in order to allow gas passage, thus attenuating the transmission of noises.

DISCLOSURE OF THE INVENTION

The object of the invention is to provide such a tube having a novel, simple, reliable and cheap design.

To this effect the liquid-impervious tube according to the invention, comprising at least one first band helically wound on itself, is characterized in that this first band is porous and pervious to gaseous fluids and in that it comprises a second thin band which is pervious to gaseous fluids and impervious to liquids, and which is also helically wound on itself, with partial overlapping of its turns, said turns being secured to one another in an impervious manner so that said second band defines a liquid-impervious continuous covering.

For example, and particularly in the automobile industry, this continuous covering is an outer covering. However, in some other applications, this continuous covering can be provided on the inner surface of the tube.

The second band can be secured to itself by adhering or by welding, and it can be secured to the first band, on at least a part of its width, also by adhering or welding.

Preferably this second band is made of a material belonging to the group which comprises polypropylene, polyester and polyethylene.

In one embodiment of the invention, the first band is wound on itself with a partial overlapping of its turns, and a marginal longitudinal zone of the second band is located between the overlapping turn portions of the first band.

Preferably, for tube manufacturing simplicity reasons, the first and second bands are secured to one another before the helical winding.

Preferably, in the particular case where the above tube must be gas-pervious, the first band is made of a porous material, for example a fibrous material, and the second band is provided with small perforations allowing gas passage while preventing liquid passage. For example, these perforations have a dimension of about 0.1 mm.

Preferably, an helical reinforcing thread, made of metal or plastics, is disposed between the first band overlapping turn portions.

BRIEF DESCRIPTION OF THE DRAWINGS

The invention will be better understood with reference to the following description, taken in conjunction with the accompanying drawing, the FIG. 1 of which is a schematic longitudinal cross-section view of a part of a tube according to a preferred embodiment of the invention.

There is partially and schematically shown in FIG. 1 a tube according to a preferred embodiment of the invention. For example, this tube is flexible and it is intended to be used in the automobile industry for transporting or conveying gaseous fluids, generally air, in the automobile internal combustion engines or passenger spaces.

The shown tube comprises a first band 1 which is helically wound on itself about an axis 10, with a partial overlapping of its turns, as shown at A. Possibly, a reinforcing thread 2, made of metal or plastics, is disposed between the overlapping turn portions of the band 1, in a known manner.

According to the invention, the above tube comprises also a second band 3 which is thin and which is made of a liquid-impervious material. This second band 3 is also helically wound on itself about axis 10, with a partial overlapping of its turns, as shown at B. The turns of the band 3 are secured to one another in a liquid-tight manner in the overlapping zones, so that this band defines a continuous covering which is impervious to liquids. In the shown example, this band 3 forms an outer covering for the tube.

The band 3 is made of a material belonging to the group comprising polypropylene, polyester and polyethylene, since these materials have a melting point about 120° C. and allow a welding of the band 3 on itself when finally passing the tube through an oven heated to about 150–170° C. This welding of the band 3 on itself could however be replaced by adhering.

In the shown example, the second band 3 has a width lower than that of the band 1 and it comprises a marginal longitudinal zone 4 which has a low width, for example about 2 mm, and which is located between the overlapping turn portions of the first band 1. In this case, the band 3, before the two band winding, is secured to the first band 1 on at least a part of its width, for example by adhering or welding, the winding being thus carried out by feeding a two layer band.

In the above particular application to the automobile industry, wherein the tube is intended to transport gaseous fluids, the tube is generally porous to allow the passage of gases while preventing the passage of liquids. To this effect, the first band 1 is made of a porous material, for example fibrous, and the second band 3 is also made porous by providing small perforations allowing both porosity and liquid-tightness. For instance, these perforations have a dimension of about 0.1 mm; these perforations can be obtained either during the manufacturing of the band 3, or preferably during the securing of the two bands 1 and 3 to one another, before winding, by means of a calendering step. This calendering provides moreover an intimate binding between the two bands.

Of course, the invention is not limited to the above disclosed embodiment and application. It is on the contrary possible to conceive various alternatives without departing from its scope as defined by the appended claims.

I claim:

1. A tube for the transportation of substantially only gas, comprising at least one first band helically wound on itself, said first band being porous and pervious to the gas; a second thin band pervious to the gas and impervious to outside liquid, said second band being helically wound on itself to obtain partially overlapping turns, said turns being secured to one another in an impervious to outside liquid manner such that said second band defines an impervious to outside liquid continuous covering.

2. The tube of claim 1, wherein the second band is secured to itself by adhering.

3. The tube of claim 1, wherein the second band is secured to itself by welding.

4. The tube of claim 1, wherein the second band is secured on at least a part of its width to the first band.

5. The tube of claim 4, wherein the second band is secured to the first band by adhering.

6. The tube of claim 4, wherein the second band is secured to the first band by welding.

7. The tube of claim 1, wherein the second band is made of a material belonging to the group which comprises polypropylene, polyester and polyethylene.

8. The tube of claim 1, wherein the first band is wound on itself with a partial overlapping of its turns, and a marginal longitudinal zone of the second band is located between the overlapping turn portions of the first band.

9. The tube of claim 1, wherein the first band is made of a fibrous material.

10. A tube for transportation of a gaseous fluid, comprising at least one first band helically wound on itself, said first band being porous and pervious to the gaseous fluid; a second thin band pervious to the gaseous fluid and impervious to liquid, said second band being helically wound on itself to obtain partially overlapping turns, said turns being secured to one another before the helical winding in an impervious to liquid manner such that said second band defines a continuous covering.

11. A tube for transportation of a gaseous fluid, comprising at least one first band helically wound on itself, said first band being porous and pervious to the gaseous fluid; a second thin band pervious to the gaseous fluid and impervious to liquid, said second band being helically wound on itself to obtain partially overlapping turns, said turns being secured to one another in an impervious to liquid manner such that the second band defines a continuous outer covering for the tube.

* * * * *